US 7,231,364 B1

(12) United States Patent
Cobrinik et al.

(10) Patent No.: US 7,231,364 B1
(45) Date of Patent: Jun. 12, 2007

(54) METHODS AND SYSTEMS FOR MANAGING INVESTMENTS IN COMPLEX FINANCIAL INVESTMENTS

(75) Inventors: Zachariah Cobrinik, New York, NY (US); Edward Logan, New York City, NY (US); Andrew Walter, New York, NY (US)

(73) Assignee: Goldman Sachs & Co., New York, NY (US)

( * ) Notice: Subject to any disclaimer, the term of this patent is extended or adjusted under 35 U.S.C. 154(b) by 1696 days.

(21) Appl. No.: 09/850,589

(22) Filed: May 7, 2001

(51) Int. Cl.
*G06Q 40/00* (2006.01)
(52) U.S. Cl. .............................. 705/37; 705/36; 705/35; 705/5; 705/26
(58) Field of Classification Search .................. 705/33, 705/36, 5
See application file for complete search history.

(56) References Cited

U.S. PATENT DOCUMENTS 5,673,402 A * 9/1997 Ryan et al. .................... 705/38
6,405,175 B1 * 6/2002 Ng ............................... 705/14
6,760,470 B1 * 7/2004 Bogosian et al. ........... 382/139
6,907,405 B2 * 6/2005 Brett ............................ 705/37

OTHER PUBLICATIONS

Yen to Succeed in the East, The Times London, May 5, 2001,p. 3, Procrest Document ID, 72491514, http://proquest.umi.com/pqdweb?did=72491514&sid=5&Fmt=3&clientId=19649&RQT=309&VName=PQD.*
Mutual Fung Won't See Tax Relief For Now, Times-Picayune. New Orleans, La,: May 6, 2001. pp. 4, Procest document ID, 72614490, http://proquest.umi.com/pqdweb?did=72491514&sid=5&Fmt=3&clientId=19649&RQT=309&VName=PQD.*

* cited by examiner

*Primary Examiner*—Frantzy Poinvil
*Assistant Examiner*—Clement Graham
(74) *Attorney, Agent, or Firm*—Greenberg Traurig, LLP (57) ABSTRACT

A metric, Investment Participation at Cost (IPAC) has been developed to determine the amount of money working in an investment vehicle. IPAC has particular application in a complex, private equity investment vehicle. Using IPAC, an investor can get a repeatable, readily understood indication of the amount of working money left in an investment. Further using IPAC, the investor, financial advisor or other interested party can, based on the money still working in any one or more investments, better determine the overall risk profile of an investment portfolio. An investment portfolio can be changed based on the risk profile as so determined.

26 Claims, 5 Drawing Sheets

METHODS AND SYSTEMS FOR MANAGING INVESTMENTS IN COMPLEX FINANCIAL INVESTMENTS

RELATED CASES

This case is related to co-pending U.S. patent application Ser. No. 09/823,353, filed on Mar. 30, 2001.

FIELD OF THE INVENTION

The present invention relates generally to methods and systems for managing investments and more particularly to methods and systems for determining investor funds working in complex financial vehicles to manage investments.

BACKGROUND OF THE INVENTION

The ability to determine risk apportionment in an investment portfolio is fundamental to the development and management of the portfolio. It is well recognized that different investors, depending on both their individual life situations and personal financial goals, need investment portfolios having different risk profiles. For example, an investor having substantial assets and desiring a high-return, long-term investment may look favorably on a portfolio biased towards high-risk investments. Such an investor does not anticipate the need to liquidate investments in the short term and will hence tolerate the volatility associated with high risk investments in light of the ultimately high expected return.

In contrast, an investor facing retirement in a relatively short period of time and facing the necessity of liquidating investments in order to fund that retirement may look more favorably on an investment portfolio biased towards lower risk investments.

The risk profile of an investment portfolio depends upon the determined inherent risk of the investment vehicles and the amount of resource, usually measured in monies, that is invested in the various investment vehicles. It may be perfectly acceptable, for example, to have a moderate or low risk portfolio with one or more high-risk investments, so long as the amount of correlation of risk among investments remains moderate in view of the overall investments.

Risk determinations and hence portfolio profiles are more readily determined where the investment vehicles are publicly traded securities or fixed-income investments. Readily available methodologies exist for determining the amount of an individual investment in such vehicles. Many information sources are available to advise on the risks associated with such vehicles. Thus, it is relatively straight-forward to determine the relative risks and monies invested in such publicly traded vehicles. Portfolio structuring and management can then be performed based on, as discussed above, each individual's personal situation and goals.

It is more difficult to make such determinations for private investments and particularly for complex private investments.

Considering, for example, a simple equity investment in a privately held company, it can be seen that there is no reliable and repeatable methodology or metric for determining the current value of an investment after it is initially made. Valuation of the company for purposes of private funding rounds give some indication as to the transient value of an equity investment at the time of closing of a round. However, this is not a regularly available or reliable metric by which an investor can judge the value of his investment. One reason is that such private funding rounds are relatively few and far apart. They do not account for interim market changes or even regular daily or even hourly market changes that may actually affect the value of the private equity of a company. Further, the valuation for private funding is typically set by a relatively few interested parties, particularly the principals of the company and the investors. This clearly will not produce the rigorous results, as does the scrutiny of the vastly larger number of potential investors in a public market.

As a private investment vehicle becomes more complex, the issues associated with valuing an investment in that vehicle also become more complex. Considering, for example, a private equity fund having multiple investors and multiple investments, the issues associated with valuing an investment in the fund become appreciably more complex. The difficulty of determining the value of investments in complex, private investment vehicles makes it difficult or impossible to accurately analyze the risk profile of an investment portfolio including investments in such vehicles. In fact, not only is value difficult to determine in these situations, but the term "value" itself has well-defined legal meanings that have no readily determined correlation to complex private financial investment vehicles.

It would be useful to have a repeatable, supportable methodology and metric for determining the current amount of an investor's investment in a private investment vehicle at any given time, termed herein the "working money" or amount of money working in any given financial vehicle. Such a metric and methodology would enable a more accurate risk assessment of a portfolio and enable the development of an investment portfolio having a risk profile that meets the needs of the associated investor. Such a metric and methodology would further facilitate decisions such as whether to buy, sell or hold an investment. Such methods, systems and apparatuses are described and claimed herein.

SUMMARY OF THE INVENTION

An object of the present invention is to provide a method and system for determining the amount of money working in an investment in a private investment vehicle.

A further object of the invention is to provide such a method and system which facilitates the development of a risk profile of an investment portfolio containing such a private investment vehicle.

Yet another object of the invention is to provide such a method and system which facilitates a decision as to whether to buy, sell or hold a position in an investment.

In accordance with the present invention there is provided a new and improved method and system for measuring and reporting an investor's working money in a complex investment vehicle.

In an embodiment of the invention, there is provided a method and system for determining an amount of investor money working in an investment vehicle including at least one investor and multiple investments, the method operable on a computer and comprising the steps of: receiving into the computer fund management information relating to the investment vehicle; receiving into the computer investor information relating to the investor; calculating on the computer an IPAC to determine the amount of money working in the investment vehicle for the investor; and outputting from the computer the first IPAC; the step of calculating the IPAC comprising:

$$IPAC_j = \frac{p_j * \left(a + \min\left[\sum_{i=1}^{n}(r_i * c_i), \sum_{i=1}^{n} r_i * m_i\right]\right)}{c_t}$$

where $$c_t = a + \sum_{i=1}^{n} c_i$$

where:
n=the total number of investments made by an investment vehicle to date, including investments which have been liquidated such as being paid out in cash or determined to have zero value
a=total called investor capital awaiting investment
$c_i$=the cost to the fund of the $i^{th}$ investment of the n investments
$m_i$=the most recent fair value of the $i^{th}$ investment as determined by the fund's manager
$r_i$=the percentage of the $i^{th}$ investment of the fund remaining at the time of the most recent distribution
$p_j$=the total capital called to date from the $j^{th}$ investor
$c_t$ (expressed formulaically above)=the total value of called capital awaiting investment plus the aggregate cost of all n fund investments In another embodiment of the invention there is provided a method and system for managing an investment profile of an investor, the method operable on a computer and comprising the steps of: determining an initial investment profile for the investor; developing, based on the initial investment profile, a recommended investment portfolio including calculating an initial investment amount in an investment fund including multiple investments; inputting into the computer fund management information relating to a change in one of the multiple investments; calculating on the computer an IPAC to determine the amount of money working in the investment vehicle for the investor; the step of calculating the first IPAC comprising $$IPAC_j = \frac{p_j * \left(a + \min\left[\sum_{i=1}^{n}(r_i * c_i), \sum_{i=1}^{n} r_i * m_i\right]\right)}{c_t}$$

Where $$c_t = a + \sum_{i=1}^{n} c_i$$

where:
n=the total number of investments made by an investment vehicle to date, including investments which have been liquidated such as being paid out in cash or determined to have zero value
a=total called investor capital awaiting investment
$c_i$=the cost to the fund of the $i^{th}$ investment of the n investments
$m_i$=the most recent fair value of the $i^{th}$ investment as determined by the fund's manager.
$r_i$=the percentage of the $i^{th}$ investment of the fund remaining at the time of the most recent distribution
$p_j$=the total capital called to date from the $j^{th}$ investor
$c_t$ (expressed formulaically above)=the total value of called capital awaiting investment plus the aggregate cost of all n fund investments
outputting from the computer the IPAC; and determining using the IPAC, if the initial investment portfolio including the change in one of the multiple investments satisfies the initial investment profile.

Further embodiments of the invention are provided for using IPAC to structure an investment portfolio and to initiate a buy, sell or hold position of an investment.

BRIEF DESCRIPTION OF THE DRAWING FIGURES

These and other objects, features and advantages of the invention will be apparent from a consideration of the detailed description of the invention when considered with the drawing Figures, in which.

DETAILED DESCRIPTION OF THE INVENTION

Described and claimed herein is a system and method for reliably and repeatedly determining and expressing, in a readily understandable manner, a metric indicating the amount of an investor's money working in a complex investment vehicle at any given time. Also set forth is a system and method for using the above to structure a portfolio, to determine and manipulate the risk profile of an investment portfolio and to initiate actions such as buy/sell/hold of investments in a portfolio.

Definitions

As used herein, the terms "investment vehicle" and "vehicle" include all private investment mediums where finds are collected from one or more investors for investment in one or more investments, including but not limited to private equity funds and real estate private equity funds. The term vehicle is used interchangeable with types of investment mechanisms, such as investment funds.

In accordance with the present invention following metric has been developed: "Investment Participation At Cost", or IPAC. As used herein, "IPAC" means a measure of working money determined in accordance with the following preferred equation:

$$IPAC_j = \frac{p_j * \left(a + \min\left[\sum_{i=1}^{n}(r_i * c_i), \sum_{i=1}^{n} r_i * m_i\right]\right)}{c_t}$$

Where $$c_t = a + \sum_{i=1}^{n} c_i$$

IPAC is applied to measure the amount of working capital IPACJ of any individual investor (i.e. any $j^{th}$ investor) in any given investment vehicle (or fund) having multiple (i.e. n) investments, where:

n=the total number of investments made by an investment vehicle to date, including investments which have been liquidated such as being paid out in cash or determined to have zero value a=total called investor capital awaiting investment $c_i$=the cost to the fund of the $i^{th}$ investment of the n investments $m_i$=the most recent fair value of the $i^{th}$ investment as determined by the fund's manager $r_i$=the percentage of the $i^{th}$ investment of the fund remaining at the time of the most recent distribution $p_j$=the total capital called to date from the $j^{th}$ investor $c_t$ (expressed formulaically above)=the total value of called capital awaiting investment plus the aggregate cost of all n fund investments.

For purposes of describing the operation of the IPAC metric and its use to manage risk allocation in an investment portfolio, the illustrative investment vehicle to which IPAC is applied will be a private equity investment fund. The investments made by the fund will be assumed to be equity investments in privately held companies. As will be appreciated, the invention has larger application to other private investment vehicles and investments such as the real estate private investment fund mentioned above.

Describing the operation of the IPAC metric in written word, IPAC represents an investor's total capital called to date, multiplied by a ratio that represents the percentage of that capital which is still in effect working for the investor after one or more specific investments have been partially or fully liquidated. The denominator of the ratio is the total cost of all investments made by the fund (excluding management fees). The numerator is the total cost of all investments that have not yet been liquidated and distributed. Where the aggregate fair value of all remaining investments, as determined by a fund manager, is lower than their cost, then that lower value is used in the numerator.

The IPAC metric generally changes only in limited circumstances, including:
1. when there is a capital call;
2. when there is a full or partial cash payout from one or more individual investments; or
3. when there is a change in the aggregate fair value as determined by the fund's manager of all investments and either the new fair value or the old fair value or both are lower than the cost.

It will be appreciated that it is this very simplicity, i.e. the fact that the IPAC metric changes in a relatively straightfoward manner in response to simple changes in the amount of capital called or distributed that makes IPAC a useful metric for measuring working money, making investment decisions and managing the risk profile of an investment portfolio.

For purposes of illustration, several examples of the implementation of the IPAC metric will now be examined.

EXAMPLE I

Given the following facts and figures relating to a private equity investment fund:

Number of Investors=100

Capital called per investor=$1,000,000.00

Total capital collected=100×$1,000,000.00=$100,000,000.00

Total fund management fees equal 1% of total capital collected, or $1,000,000.00

Total invested capital equals the total capital collected less the management fees, or $99,000,000.00

Total initial invested capital per investor equals the called capital less management fees, or $990,000.00

Number of investments=n=10

Total capital awaiting investment=a=$0

Cost per investment=$c_i$=$9,900,000.00

Market value=$m_i$=$c_i$ is not less than $9,900,000.00 for all investments

Investment 1 has been sold in it's entirety for $50,000,000.00

As a result of the sale of investment 1, the sum of $500,000.00 has been returned to each of the 100 investors Each of the remaining investments remains untouched, that is $r_i$=100% for the remaining 9 investments Assuming now that it is desired to calculate the working money of one of the investors in the fund for purposes of evaluating the risk profile of his overall investment portfolio.

As noted above, one of the initial 10 investments has been liquidated and distributed in its entirety. Because each of the remaining investments is whole ($r_i$=100%) and in no case is the fair value less than the cost (min ($c_i$; $m_i$)=$c_i$ for all i), then the bracketed numerator of IPAC=9×$9,900,000, or $89,100,000.00. The total of all called and invested capital=$c_t$=$99,000,000.00.

Thus, the IPAC of any investor whose total working capital called to date=$p_j$=$990,000.00 is 89.1/99×$990,000.00 or $891,000.00.

EXAMPLE II

Assuming now that 50% of a second investment in the same fund is liquidated for an amount of $100,000,000.00. $1,000,000.00 is subsequently paid out to each investor. All other positions and values relating to the fund and to the investments therein remain the same. It is noted that the remaining 50% of the fund has the same fair market valuation as the liquidated half, or $100,000,000.00 (this will be relevant to EXAMPLE III below).

Because the market value of the partially liquidated fund has increased, the sum of the costs will be the min factor in the numerator and it will be calculated now that the numerator of IPAC drops by $4,950,000.00, i.e. one-half of the cost of the 50% liquidated investment, i.e. from $89,100.000.00 to $84,150,000.00.

The IPAC of each investor whose total working capital called to date remains at $990,000.00 is 84.15/99 of the working invested capital, i.e. 84.15/99×$990,000.00 or $841,500.

EXAMPLE III

Assuming now that one of the remaining investments goes bankrupt, the value thereof dropping to 0, while a second investment has a market value, based on a recent initial public offering, of $4,950,000.00, or ½ of its initial cost. In this example, there are no additional payouts to investors but only diminished values based on the changing market value of the investments. All other positions and values relating to the flud and to the investments therein remain the same.

While several of the investments have been devalued, it will be noted that due to the increase in market value of the investment noted in EXAMPLE II above, the overall market value of the investment fund has increased. Thus, IPAC will use the lesser of market value or cost, i.e. cost. It will be readily calculated that the numerator of IPAC drops by $14,850,000.00, i.e. the value of the drop in the two noted investments, to from $84,150,000.00 to $69,300,000.00. That is, the bankrupt investment drops from the initial cost of $9,900,000.00 to a value of 0. The publicly offered investment has been determined by the public market to have a decrease in value of $4,950,000.00 from its initial cost of $9,990,000.00 down to $4,950,000,00. Since the market value of all remaining investments is less than their cost, the lower figure is used in the numerator.

The IPAC of each investor whose total working capital called to date remains at $990,000.00 is 69.3/99 of that invested capital, or $693,000.00.

EXAMPLE IV

Assuming now that an additional capital call is placed to each investor for an additional $100,000.00 each. This additional capital is held and not immediately invested, and hence, after the deduction of a 1% management fee, the value of a increases from 0 to 100×$99,000.00 or $9,900,000.00. All other positions and values relating to the fund and to the investments therein remain the same.

It will again be calculated that the numerator of IPAC increases by the value of a, the additional called capital, to $69,300,000.00+$9,900,000.00 or $79,200,000.00. The denominator of IPAC similarly increases by the value of a, the additional called capital, to $99,000,000.00+$9,900,000.00, or $108,900,000.00.

Each investor now has committed $1,089,000.00 in working called capital.

The IPAC for each investor is thus 79.2/108.9×$1,089,000.00 x=$792,000.00.

It will be appreciated that if at any time IPAC was calculated the total market value of the investments was less than the total cost of the investments, then the lower market value would constitute IPAC. While market value can go below cost at any time in the life of the find, it is typically more likely to happen early in the life of a fund before any single one of the investments has an opportunity to appreciate in value, thereby offsetting losses in the remaining funds.

It will thus be seen that, as a metric, IPAC provides a repeatable and understandable calculation representative of the amount of an investor's money working in a complex, otherwise difficult to value, private investment. The IPAC metric is determined independently of the amount of any payouts the fund may return to its investors. It is independent of any fees such as management fees which may be associated with the operation of the fund. With the exception of a diminution of an investment market value below the actual fund investment cost, or an event that liquidates an investment with no payout (i.e. a bankruptcy), the IPAC is further independent of transiently diminished values of the various investments.

To avoid confusion and complexity, the IPAC ignores investment management costs, which are reported to investors in other standardized reports. Further, IPAC is clearly distinguishable from "value," which as described above has definitive legal meanings and which is difficult or impossible to determine in a private equity investment.

As will be seen from a consideration of the materials set out below, because IPAC can be equated with monies working in an investment vehicle, it can be used to make buy, sell or hold decisions and to determine the relative risk profile of an investment portfolio.

Description of the System

Figure 1:
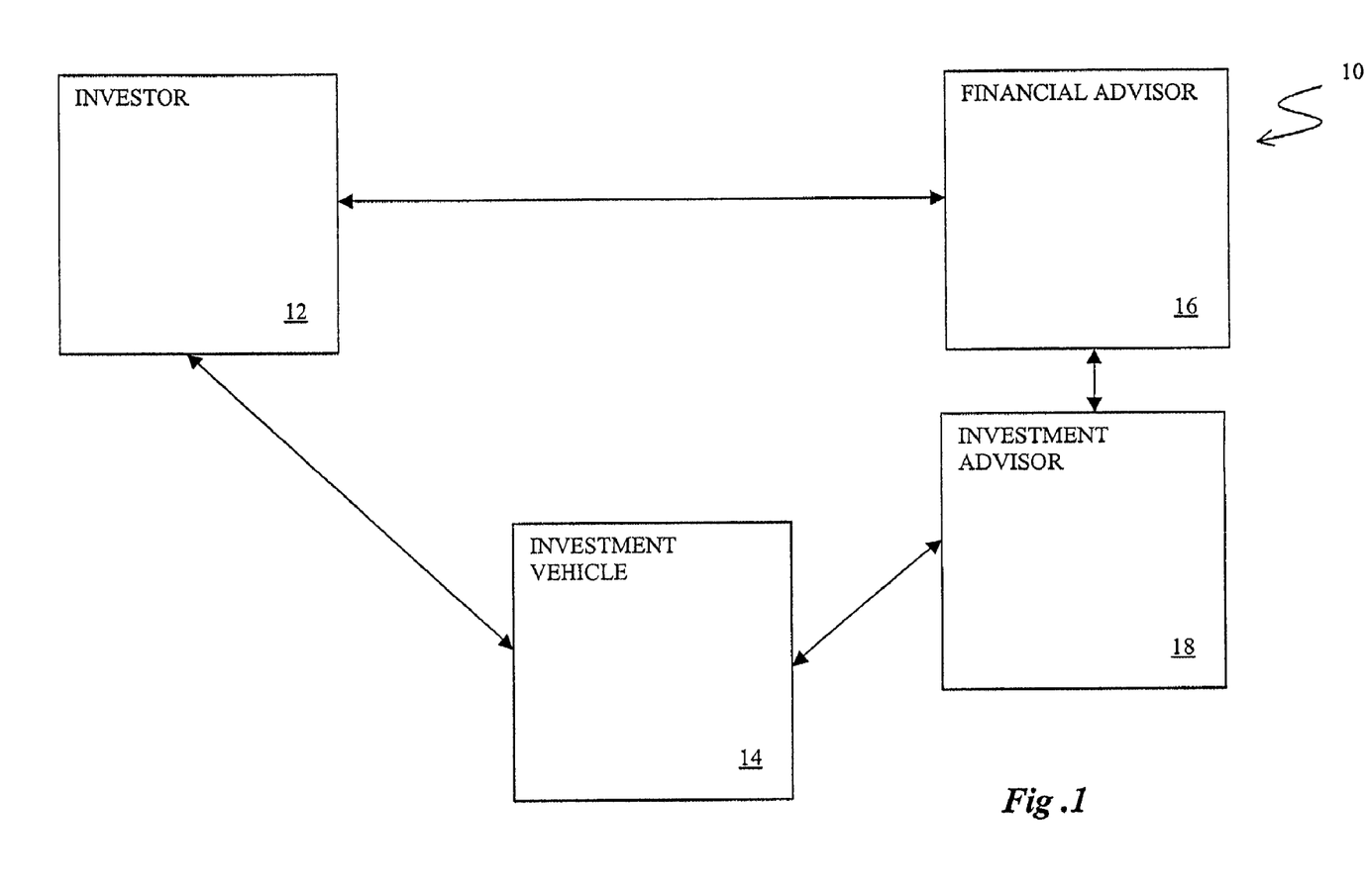
FIG. 1 is a block diagram showing an exemplary relationship between an investor and related advisors and supporters.

With reference now to FIG. 1, a block diagram 10 is shown illustrating typical relationships between an investor 12 and the various parties associated with advising, counseling and assisting the investor in developing an investment portfolio and making investments such as in an investment vehicle 14. For purposes of illustration, investment vehicle 14 comprises a private equity fund of the type described above.

Investor 12 typically establishes a relationship with a financial advisor or counselor, 16, whose function it is to advise the investor both on the development of an overall investment portfolio and on individual investments such as fund 14. Financial advisor 16 communicates with an investment advisor 18 who functions to identify and characterize investments for consideration by investor 12. Financial advisor 16, and investment advisor 18 and may work, for example, for an investment bank. Typically, multiple investment vehicles 14 will be identified and available to investor 12, each having different investment characteristics and risk profiles.

Figure 2:
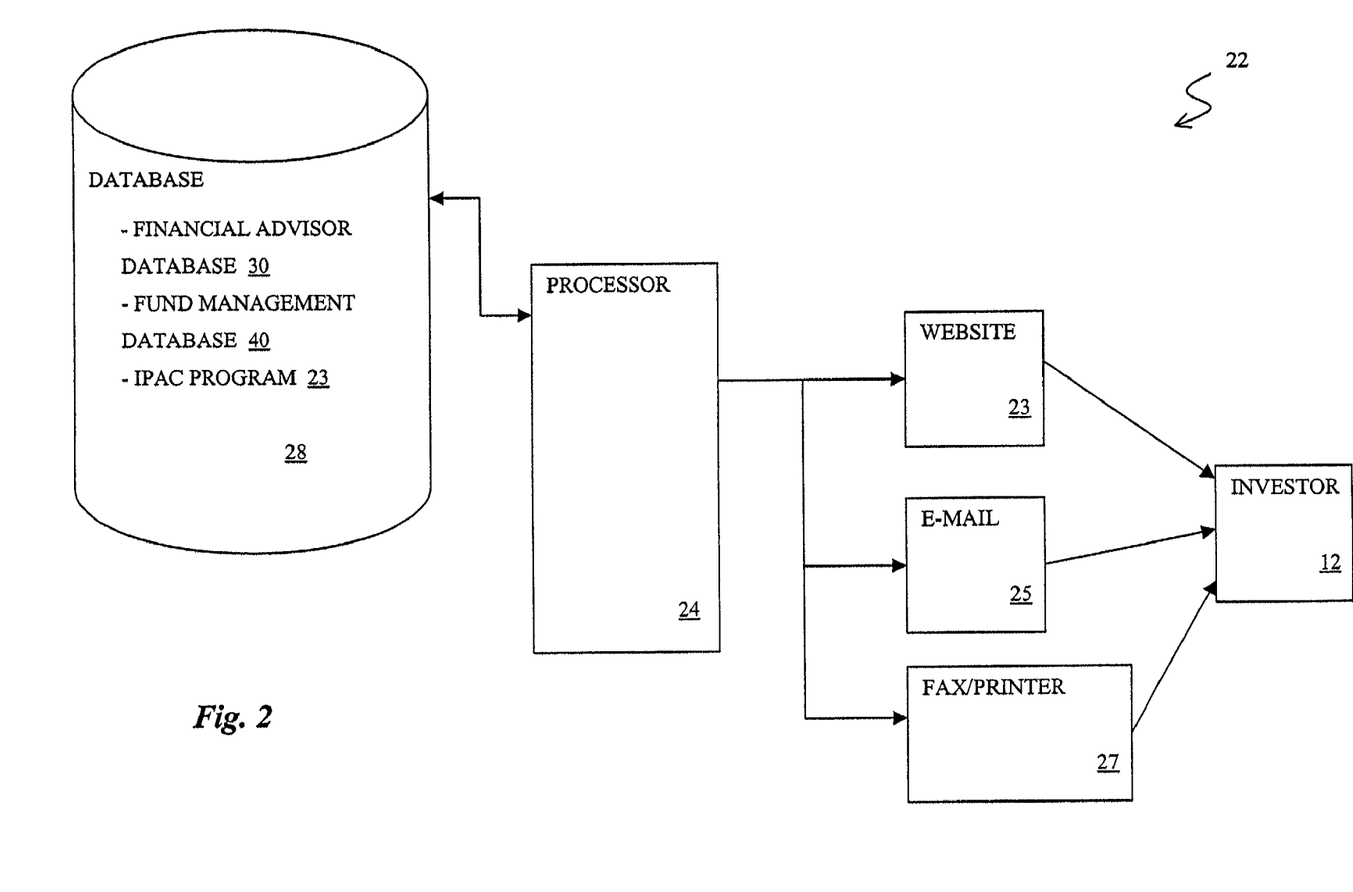
FIG. 2 is a block diagram showing a computer system implemented in accordance with the present invention.

With reference now to FIG. 2, one exemplary computer system 22 is shown functional to implement the present invention. Computer system 22 is seen to include a processor 24 and a database 28. Processor 24 comprises a standard computing system such as an Intel™ microprocessor-based system running a Microsoft™ Windows™ operating system. Database 28 comprises a conventional storage device comprising an appropriate combination of magnetic, optical and semiconductor storage medium.

Processor 24 includes a conventional network connection (not shown) for providing a communications interface to other computing systems. Processor 24 further comprises conventional communications interfaces for communicating with investor 12 through, for example, a website 23, an e-mail system 25 or a facsimile device or printer 27. These and other equivalent communications interfaces and devices are well known to those skilled in the art.

Database 28 is seen to include a financial advisor database 30 containing records such as investor goals, called capital, distributed capital and committed capital, and current investment information. A fund management database 40 contains information such as fund identification and risk assessment information, as well as fund financial information including the cost of the investment, fair value of the investment (as determined by the fund management) and the remaining portion to be invested.

Database 28 further includes an IPAC program 27, comprising a computer implementation of the IPAC metric described above, implemented using any conventional programming language, for example C or Fortran, or implemented in a conventional spreadsheet, for example Microsoft™ EXCEL™.

As described in detail below, program 27 receives information from financial advisor database 30 and fund management database 40 and operates to calculate an IPAC metric. Once determined the IPAC may then be output, for example and without limitation, in humanly readable form such as to a printer, a website, or an email. The financial advisor 16 and investor 12 may then use this output to make decisions to increase, decrease or leave unchanged their invested capital.

Description of the Databases

Figure 3:
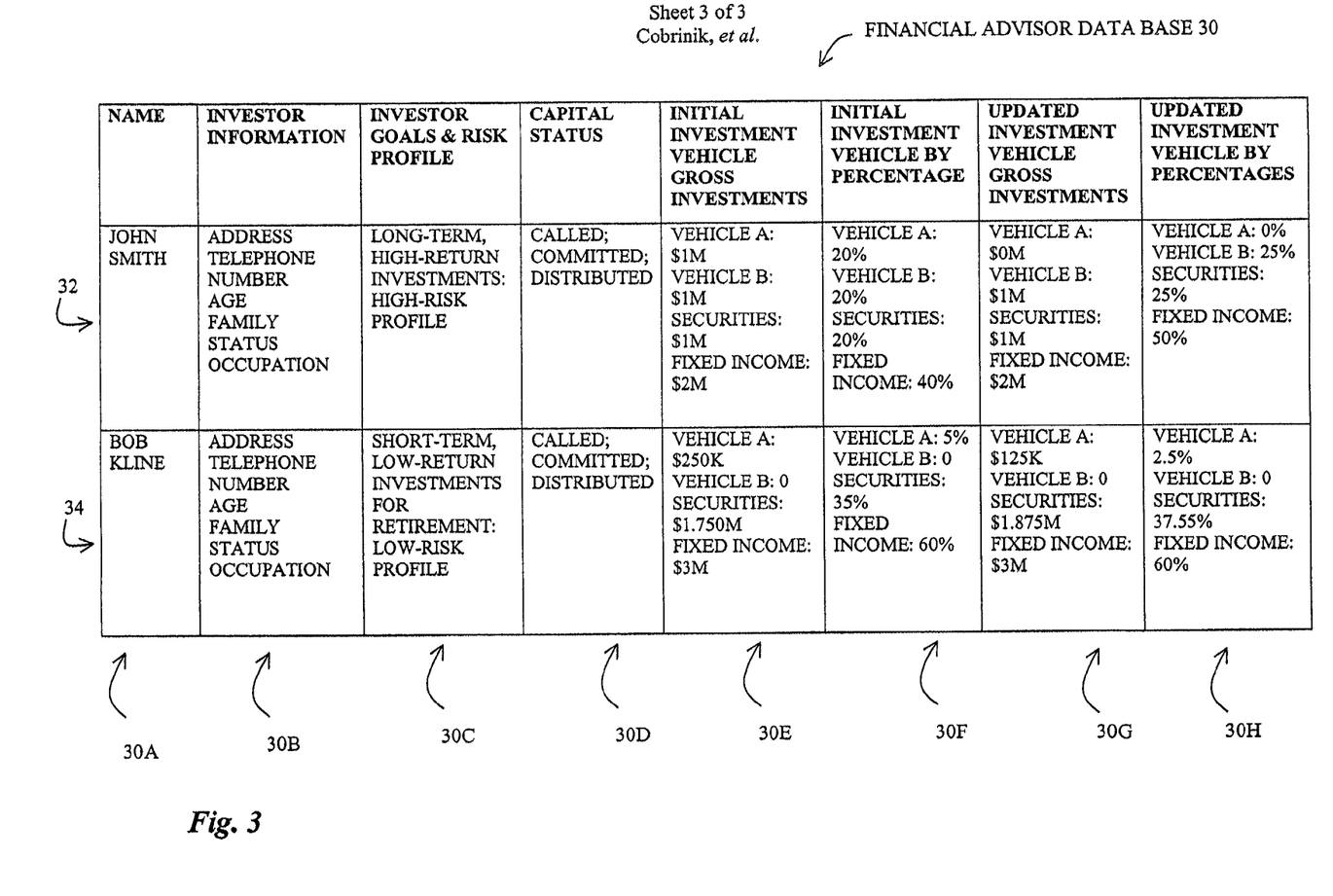
FIG. 3 is a table showing the contents of the financial advisor database of FIG. 2.

Referring now to FIG. 3, financial advisor database 30 is shown to include two data records 32 and 34, respectively, each including eight fields indicated at 30A–30H. It will be appreciated that any number of fields can be contained in investor database 30.

Financial advisor database 30 is constructed to include relevant information relating to investor(s) 12 for use by financial advisor 16. Examining the contents of financial advisor database 30, field 30A is seen to include the investor name. Additional fields include investor information (30B), investor goals and risk profile (30C), capital status including amounts of called, committed and distributed investment capital (30D), initial investment vehicle gross investments (30E), initial investment vehicle by percentage (30F) and updated investment vehicle gross investment and by percentage (30G and 30H, respectively).

When financial advisor database 30 is developed and maintained by financial advisor 16, the advisor collects the investor information (field 30B) necessary to develop the investor risks and goals (field 30C). Relevant investor information may include, for example and in addition to standard identifying information, age, occupation, family status, current financial position, anticipated retirement goals and pension, and additional other information that will assist the advisor in developing a portfolio recommendation including a risk profile.

Capital status information (30D) is maintained to describe the financial status of the investor relative to his investments. This field may include, for example and without limitation, investor capital information such as: total funds committed by the investor, funds called from the investor but not yet distributed and funds both called and distributed.

As seen in financial advisor database 30, the investor John Smith identified in data record 32 is best served by an investment portfolio weighted towards long-term, high-return, high-risk investments. In contrast, investor Bob Kline, identified in data record 34, is best served by a lower risk, lower return investment portfolio.

The nature of the remaining data fields in investor database 30 will be described in detail with respect to the process illustrated in FIG. 5 below.

Figure 4:
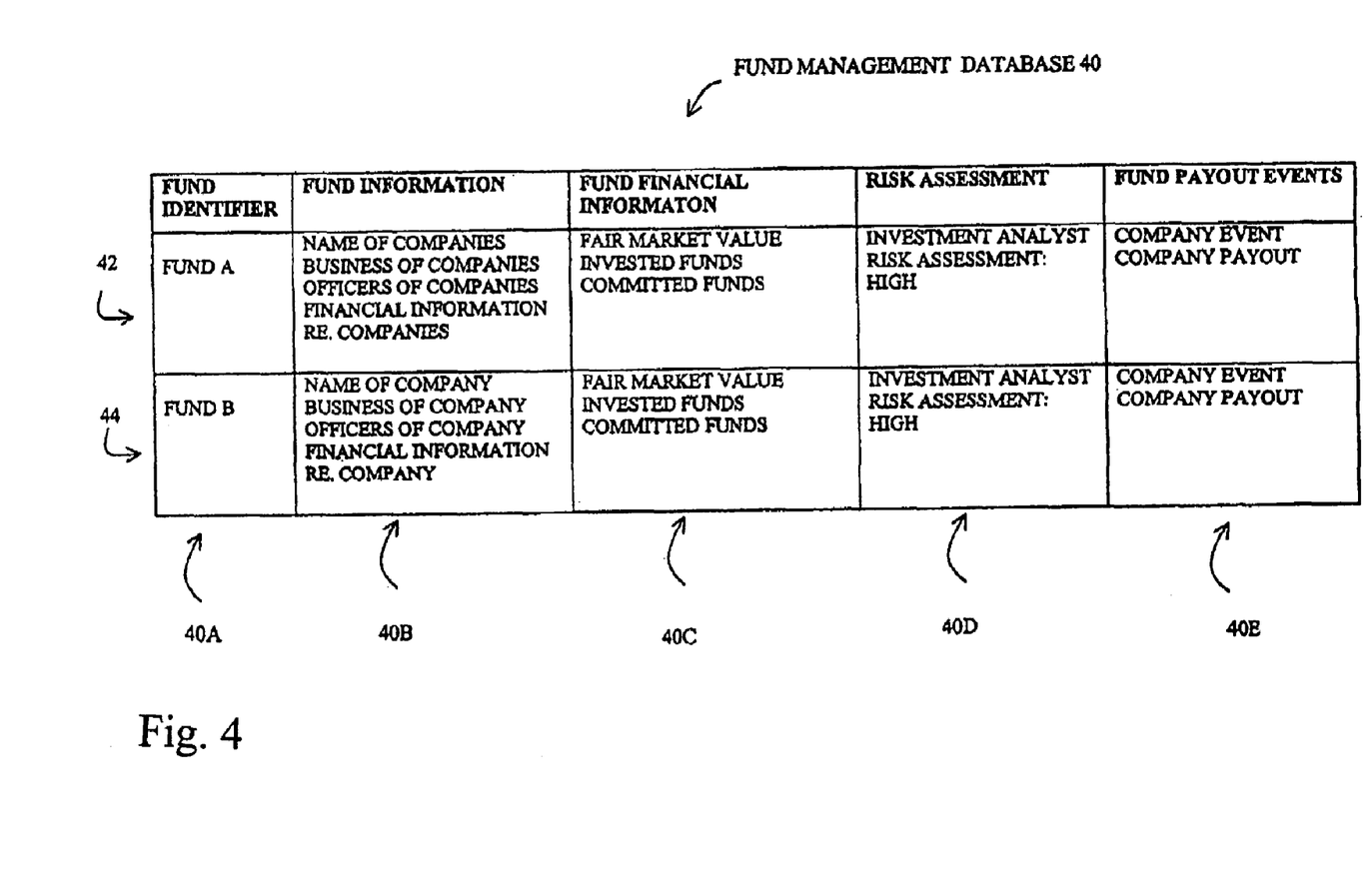
FIG. 4 is a table showing the contents of the fund management database of FIG. 2.

With reference now to FIG. 4, fund management database 40 is shown to include two data records, record 42A including information relating to a fund A, and record 44 including information relating to a fund B. In practice, it will be understood that fund management database 40 can include any number of data records to track multiple investment vehicles.

Fund management database 40 is constructed to track information relating to various investment finds. Examining the contents of fund database 40, field 40A is seen to include information identifying the various investment funds, while detailed fund information is stored in field 40B. Detailed fund information includes information relating to the management and various investments of the funds. Detailed financial information relating to the fund, for example including committed and invested funds as well as a history of fair market value determinations (as determined by the fund management) is maintained in field 40C. A risk assessment of each fund, determined for example by investment advisor 18, is stored in data field 40D, while fund payout events are stored in field 40E.

Both of the funds A and B are seen to comprise high-risk investments.

Fund payout events (field 40E) include events that directly affect the value of the fund investments, including but not limited to: liquidation of equity to fund partial or full investor payouts, bankruptcy or closure events that would drive value to 0, initial public offerings and other events well known to those skilled in the art.

Description of Operation

Figure 5:
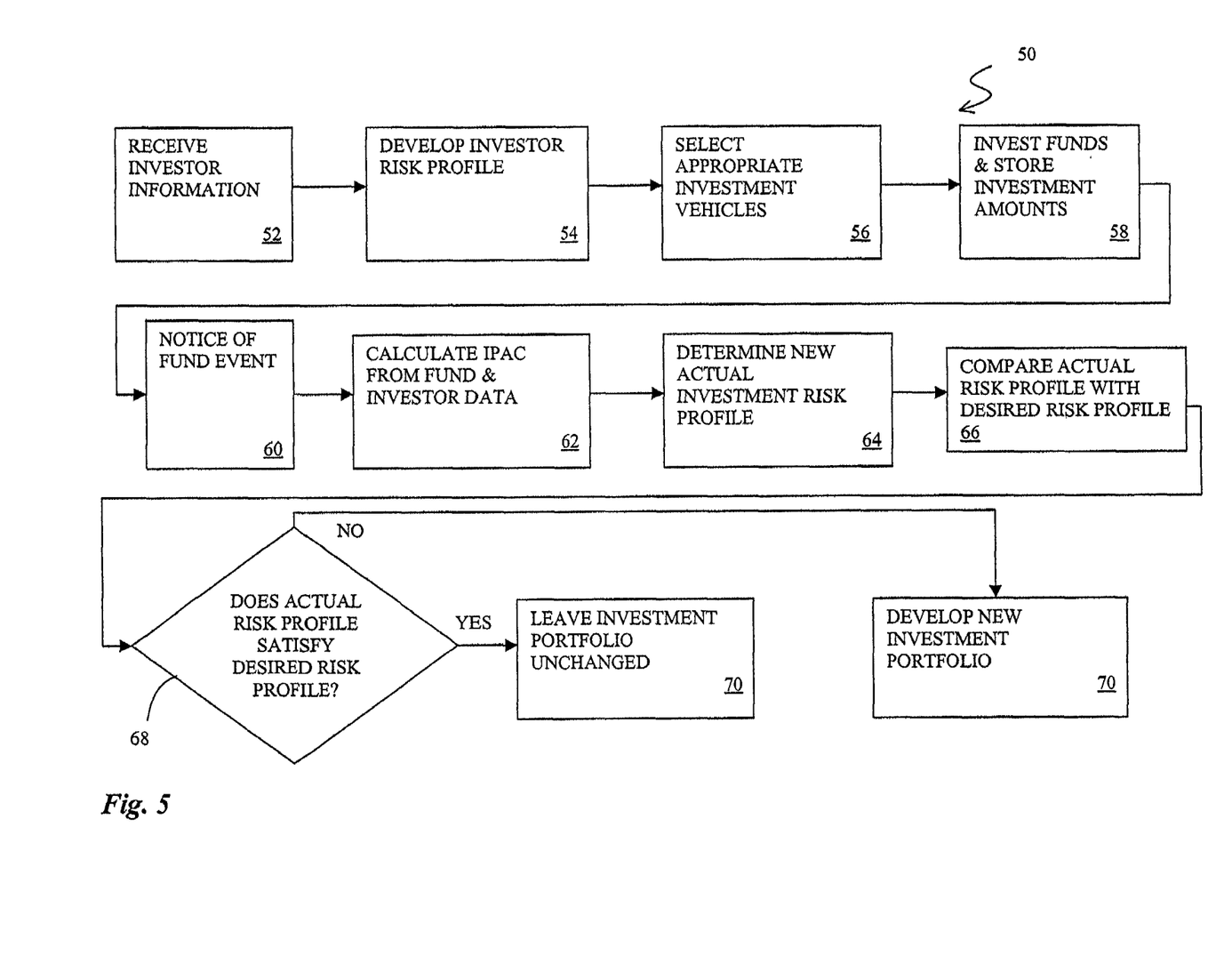
FIG. 5 is a flow chart showing one method of managing the risk profile of an investment portfolio in accordance with the present invention.

With reference now to FIG. 5, one process 50 is shown for developing and managing an investment portfolio in accordance with the present invention.

Initially, a financial advisor 16 interviews an investor 12 to collect necessary information regarding the investor's personal and financial situation (step 52) so as to develop a recommended portfolio based at least in part on an appropriate risk profile (step 54). This information is stored in financial advisor database 30. Subsequently, financial advisor 16 may recommend that at least some of the funds available for investment be placed into an investment vehicle such as fund A or B in fund management database 40 (step 56).

Upon placement of the investor monies in the appropriate funds(s), fields 30D, 30E and 30F of financial advisor database 30 are updated to reflect the initial costs both by gross dollar amount (fields 30D, E) and by percentage of total portfolio (field 30F) (step 58).

Subsequently, the portfolio is watched in a well-known manner as its value changes with respect to fluctuations in prices of publicly traded equities and fixed-income investments (not shown). The portfolio profile can be updated in a conventional manner as these values fluctuate. Readily liquid investments can be altered as deemed desirable by the investor and the financial advisor.

With respect to the present invention, the next significant event is the receipt of notice of an event that changes the value of an investment in fund A or B (step 60). Such an event may comprise, for example, some liquidation of equity so as to liquidate some or all of the fund's interest in the vehicle. Other events include, for example, bankruptcy, a public offering, or such other event that will directly affect the value of the fund investment in the vehicle so as to affect the IPAC in the manner described hereinabove.

Subsequent to the receipt of notice of such an event, the IPAC is calculated for individual investors, as per the examples described above, to determine the amount of money each investor still has working in the fund (step 62).

Because each investor's working monies in the vehicle experiencing the event will have changed, it becomes desirable to determine the new (i.e. updated or actual) investment risk profile (step 64). This is done by using the IPAC metric to determine actual gross investment (field 30G of FIG. 3) and percentage investment (field 30H of FIG. 3) of working money remaining in the investment vehicle. It will be understood that the IPAC value itself is, in fact, calculated on the gross investment (30G), while the percentage of that gross investment relative to the values of the other investments in the portfolio represents the percentage investment (30H)t.

Subsequently, the actual risk profile in view of the investment event is compared with the desired risk profile established at the outset (step 66) to determine if the investor's portfolio profile continues to meet his or her needs (step 68). If the investment profile is appropriate, it may be recommended that no change be made (step 70). If the investment profile is no longer appropriate in view of the change in the investor's money working in the fund that underwent the event, then it may be recommended that the investor revisit the portfolio (step 72) with the view of changing distributions in various individual investments.

With reference back to FIG. 1, investor notification of information relating to his investments, including the IPAC metric described herein, may be communicated to investor 12 via a communications channel such as an Internet website, an e-mail, a facsimile, a printout (mailed, for example) or other well-known methods of communications including broadcast to cellular telephones and personal digital assistants. It will be understood that the development of a changed or new investment portfolio will be accomplished through the sale or purchase of an investment or other management of the investor's funds in manners well known in the art.

EXAMPLE V

With reference to FIGS. 3 and 4, it is seen that investor John Smith (record 32 of FIG. 3) was initially set up with a relatively high-risk portfolio including investments of $1M each, or 20% of total investments each for a total of 40% of the portfolio, in high-risk fund vehicles A & B (see fields 30E and 30F of FIG. 3). Subsequent to a fund event, for example a payout based on his investment in fund A, his IPAC in vehicle A dropped to 0 (field 30H) and his total investment in the high-risk, private equity funds A and B dropped to a total of 25%.

John Smith and his financial advisor will thus evaluate the new risk profile of his investment portfolio to determine if changes are appropriate.

EXAMPLE VI

With reference to FIGS. 3 and 4, it is seen that investor Bob Kline (record 34 of FIG. 3) was initially set up with a relatively low-risk portfolio including an investment of $250K, or 5% of total investments, in high-risk fund vehicle A (see fields 30E and 30F of FIG. 3).

Subsequent to a fund event, one-half of Kline's equity interest in fund A, the total of which was purchased for the $250,000.00 noted above, was liquidated, paying to him the amount of $500,000.00.

It will be appreciated that, using traditional methodologies, there is no appropriate, simple and understandable methodology for informing Kline of the relative amount of his investment still working in vehicle A. For example, a methodology based on the increased value of the fund will grossly inflate his actual cash investment in comparison to other investments.

However, using the IPAC metric described above, it can be determined that Kline still has $125,000.00 of his initial investment actually working for him in fund A. Thus, for purposes of determining the risk profile of his investment portfolio, 2.5% of his investment dollars continue to work for him in high-risk fund A.

Based on this analysis, Kline and his financial advisor can determine if his investment portfolio should be adjusted.

While the invention has been shown and described with respect to risk management, IPAC can be used at any time and for any reason with respect to facilitating a decision to buy, sell or hold an investment position or to otherwise structure an investment portfolio.

While the invention has been shown and described with respect to particular embodiments, numerous modifications, changes, variations and improvements will occur to those skilled in the art that fall within the contemplation of this patent.

What is claimed is:

1. A method of using a computer to determine an amount of investor money working in an investment vehicle including at least one investor and multiple investments, comprising the steps of:

receiving fund management information relating to said investment vehicle;

receiving investor information relating to an investor;

calculating on said computer, using said fund management information and said investor information, an IPAC to determine the amount of money working in said investment vehicle; and outputting from said computer said IPAC;

said step of calculating said IPAC comprising $$IPAC_j = \frac{p_j * \left(a + \min\left[\sum_{i=1}^{n}(r_i * c_i), \sum_{i=1}^{n} r_i * m_i\right]\right)}{c_t}$$

Where $$c_t = a + \sum_{i=1}^{n} c_i$$

where:

n=the total number of investments made by an investment vehicle to date, including investments which have been liquidated such as being paid out in cash or determined to have zero value a=total called investor capital awaiting investment $c_i$=the cost to the find of the $i^{th}$ investment of the n investments $m_i$=the most recent fair value of the $i^{th}$ investment as determined by the fund's manager $r_i$=the percentage of the $i^{th}$ investment of the fund remaining at the time of the most recent distribution $p_j$=the total capital called to date from the $j^{th}$ investor $c_t$ (expressed formulaically above)=the total value of called capital awaiting investment plus the aggregate cost of all n fund investments.

2. A method in accordance with claim 1 and further including the steps of:

calculating an individual IPAC for each of a plurality investors in said investment vehicle; and outputting each of said individual IPAC's.

3. A method in accordance with claim 2 and further including the steps of:

outputting for each of the investors a profile including a list of said multiple investments of said investment vehicle;
outputting for each of the investors said IPAC; and
providing a respective profile and IPAC to each of the investors.

4. Apparatus for determining an amount of investor money working in an investment vehicle including at least one investor and multiple investments, comprising:
a processor;
a memory connected to said processor, said memory including instructions for controlling the operation of said processor;
said processor operative with said instructions in said memory to perform the steps of
inputting into the computer fund management information relating to said investment vehicle;
inputting into the computer investor information relating to an investor;
calculating on said computer, using the fund management and investor information, a first IPAC to determine the amount of money working in said investment vehicle for a first investor; and
outputting from said computer said IPAC;
said step of calculating said IPAC comprising $$IPAC_j = \frac{p_j * \left(a + \min\left[\sum_{i=1}^{n}(r_i * c_i), \sum_{i=1}^{n} r_i * m_i\right]\right)}{c_t}$$

Where $$c_t = a + \sum_{i=1}^{n} c_i$$

where:
n the total number of investments made by an investment vehicle to date, including investments which have been liquidated such as being paid out in cash or determined to have zero value
a=total called investor capital awaiting investment
$c_i$=the cost to the fund of the $i^{th}$ investment of the n investments
$m_i$=the most recent fair value of the $i^{th}$ investment as determined by the fund's manager
$r_i$=the percentage of the $i^{th}$ investment of the fund remaining at the time of the most recent distribution
$p_j$=the total capital called to date from the $j^{th}$ investor
$c_t$ (expressed formulaically above)=the total value of called capital awaiting investment plus the aggregate cost of all n fund investments.

5. The apparatus of claim 4 wherein said processor is further operative to perform the steps of:
calculating an individual IPAC for each of a plurality of investors in said investment vehicle; and
outputting each of said individual IPAC's.

6. The apparatus of claim 5 wherein said processor is further operative to perform the steps of:
outputting for each of the investors a profile including a list of said multiple investments of said investment vehicle;
outputting for each of the investors said IPAC; and
providing a respective profile and IPAC to each of the investors.

7. The apparatus of claim 5 wherein said memory further stores a financial advisor database containing information relating to the at least one investor.

8. The apparatus of claim 5 wherein said memory further stores a fund management database containing information relating to said multiple investments.

9. Apparatus for determining an amount of investor money working in an investment vehicle including at least one investor and multiple investments, comprising:
means for determining fund management information relating to said investment vehicle;
means for determining investor information relating to an investor;
means for calculating on said computer, using said fund management information and said investor information, an IPAC to determine the amount of money working in said investment vehicle for a first investor; and
means for outputting from said computer said IPAC;
said step of calculating said IPAC comprising $$IPAC_j = \frac{p_j * \left(a + \min\left[\sum_{i=1}^{n}(r_i * c_i), \sum_{i=1}^{n} r_i * m_i\right]\right)}{c_t}$$

Where $$c_t = a + \sum_{i=1}^{n} c_i$$

where:
n=the total number of investments made by an investment vehicle to date, including investments which have been liquidated such as being paid out in cash or determined to have zero value
a=total called investor capital awaiting investment
$c_i$=the cost to the fund of the $i^{th}$ investment of the n investments
$m_i$=the most recent fair value of the $i^{th}$ investment as determined by the fund's manager
$r_i$=the percentage of the $i^{th}$ investment of the fund remaining at the time of the most recent distribution
$p_j$=the total capital called to date from the $j^{th}$ investor
$c_t$ (expressed formulaically above)=the total value of called capital awaiting investment plus the aggregate cost of all n fund investments.

10. A program product containing computer-executable instructions operative to control a computer to determine an amount of investor money working in an investment vehicle including at least one investor and multiple investments, said program product comprising:
said instructions operative to control said computer to perform the steps of inputting into the computer fund management information relating said investment vehicle;
inputting into the computer investor information relating to an investor;
calculating on said computer, using said fund management information and said investor information, an IPAC to determine the amount of money working in said investment vehicle for a investor; and outputting from said computer said IPAC;
said step of calculating said IPAC comprising $$IPAC_j = \frac{p_j * \left(a + \min\left[\sum_{i=1}^{n}(r_i * c_i), \sum_{i=1}^{n} r_i * m_i\right]\right)}{c_t}$$

Where $$c_t = a + \sum_{i=1}^{n} c_i$$

where:
- n=the total number of investments made by an investment vehicle to date, including investments which have been liquidated such as being paid out in cash or determined to have zero value
- a=total called investor capital awaiting investment
- $c_i$=the cost to the fund of the $i^{th}$ investment of the n investments
- $m_i$=the most recent fair value of the $i^{th}$ investment as determined by the fund's manager
- $r_i$=the percentage of the $i^{th}$ investment of the fund remaining at the time of the most recent distribution
- $p_j$=the total capital called to date from the $j^{th}$ investor
- $c_t$ (expressed formulaically above)=the total value of called capital awaiting investment plus the aggregate cost of all n fund investments.

11. A method of determining an amount of investor money working in an investment vehicle including at least one investor and multiple investments, comprising the steps of:
- determining fund management information relating to said investment vehicle;
- determining investor information relating to said at least one investor;
- calculating an IPAC to determine the amount of money working in said investment vehicle for an investor; and
- providing said IPAC to said investor;
- said step of calculating said IPAC comprising $$IPAC_j = \frac{p_j * \left(a + \min\left[\sum_{i=1}^{n}(r_i * c_i), \sum_{i=1}^{n} r_i * m_i\right]\right)}{c_t}$$

Where $$c_t = a + \sum_{i=1}^{n} c_i$$

where:
- n=the total number of investments made by an investment vehicle to date, including investments which have been liquidated such as being paid out in cash or determined to have zero value
- a=total called investor capital awaiting investment
- $c_i$=the cost to the fund of the $i^{th}$ investment of the n investments
- $m_i$=the most recent fair value of the $i^{th}$ investment as determined by the fund's manager
- $r_i$=the percentage of the $i^{th}$ investment of the fund remaining at the time of the most recent distribution
- $p_j$=the total capital called to date from the $j^{th}$ investor
- $c_t$ (expressed formulaically above)=the total value of called capital awaiting investment plus the aggregate cost of all n fund investments.

12. A method of using a computer to manage an investment profile of an investor, comprising the steps of:
- determining an initial investment profile for said investor;
- developing, based on said initial investment profile, a recommended investment portfolio including calculating an initial investment amount in an investment fund including multiple investments;
- inputting into the computer fund management information relating to a change in one of said multiple investments;
- receiving into the computer investor information relating to said investor;
- calculating on the computer an IPAC to determine the amount of money working in said investment vehicle for said investor;
- said step of calculating said first IPAC comprising $$IPAC_j = \frac{p_j * \left(a + \min\left[\sum_{i=1}^{n}(r_i * c_i), \sum_{i=1}^{n} r_i * m_i\right]\right)}{c_t}$$

Where $$c_t = a + \sum_{i=1}^{n} c_i$$

where:
- n=the total number of investments made by an investment vehicle to date, including investments which have been liquidated such as being paid out in cash or determined to have zero value
- a=total called investor capital awaiting investment
- $c_i$=the cost to the fund of the $i^{th}$ investment of the n investments
- $m_i$=the most recent fair value of the $i^{th}$ investment as determined by the fund's manager
- $r_i$=the percentage of the $i^{th}$ investment of the fund remaining at the time of the most recent distribution
- $p_j$=the total capital called to date from the $j^{th}$ investor
- $c_t$ (expressed formulaically above)=the total value of called capital awaiting investment plus the aggregate cost of all n fund investments
- outputting from said computer said IPAC;
- determining using said IPAC, if said initial investment portfolio including said change in one of said multiple investments satisfies said initial investment profile.

13. A method in accordance with claim 12 and further including the step of recommending to said investor a change in said investment portfolio.

14. A method in accordance with claim 13 and further including the steps of:
- outputting said recommended portfolio;
- outputting said change to said one of said multiple investments;
- outputting said IPAC; and providing said recommended portfolio, said change to said one of said multiple investments and said IPAC to said investor.

15. Apparatus for managing an investment profile of an investor, comprising:
a processor;
a memory connected to said processor, said memory containing instructions operative with said processor to perform the steps of
determining an initial investment profile for said investor;
developing, based on said initial investment profile, a recommended investment portfolio including calculating an initial investment amount in an investment fund including multiple investments;
inputting into the computer fund management information relating to a change in one of said multiple investments;
inputting into the computer investor information relating to said investor;
calculating on the computer an IPAC to determine the amount of money working in said investment vehicle for said investor;
said step of calculating said first IPAC comprising $$IPAC_j = \frac{p_j * \left(a + \min\left[\sum_{i=1}^{n}(r_i * c_i), \sum_{i=1}^{n} r_i * m_i\right]\right)}{c_t}$$

Where $$c_t = a + \sum_{i=1}^{n} c_i$$

where:
n=the total number of investments made by an investment vehicle to date, including investments which have been liquidated such as being paid out in cash or determined to have zero value
a=total called investor capital awaiting investment
$c_i$=the cost to the fund of the $i^{th}$ investment of the n investments
$m_i$=the most recent fair value of the $i^{th}$ investment as determined by the fund's manager
$r_i$=the percentage of the $i^{th}$ investment of the fund remaining at the time of the most recent distribution
$p_j$=the total capital called to date from the $j^{th}$ investor
$c_t$ (expressed formulaically above)=the total value of called capital awaiting investment plus the aggregate cost of all n fund investments
outputting from said computer said IPAC; and
determining using said IPAC, if said initial investment portfolio including said change in one of said multiple investments satisfies said initial investment profile.

16. The apparatus of claim 15 wherein said processor is further operative with the instructions in said memory to perform the steps of:
outputting said recommended portfolio;
outputting said change to said one of said multiple investments;
outputting said IPAC; and
transmitting said recommended portfolio, said change to said one of said multiple investments and said IPAC to said investor.

17. The apparatus of claim 15 wherein said memory further contains an investor database containing information relating to the investors.

18. The apparatus of claim 15 wherein said memory further contains an investment database containing information relating to said multiple investments.

19. A method for managing an investment profile of an investor, comprising the steps of:
determining an initial investment profile for said investor;
developing, based on said initial investment profile, a recommended investment portfolio including calculating an initial investment amount in an investment fund including multiple investments;
determining a change in one of said multiple investments;
calculating an IPAC to determine the amount of money working in said investment vehicle for said investor;
said step of calculating said first IPAC comprising $$IPAC_j = \frac{p_j * \left(a + \min\left[\sum_{i=1}^{n}(r_i * c_i), \sum_{i=1}^{n} r_i * m_i\right]\right)}{c_t}$$

Where $$c_t = a + \sum_{i=1}^{n} c_i$$

where:
n=the total number of investments made by an investment vehicle to date, including investments which have been liquidated such as being paid out in cash or determined to have zero value
a=total called investor capital awaiting investment
$c_i$=the cost to the fund of the $i^{th}$ investment of the n investments
$m_i$=the most recent fair value of the $i^{th}$ investment as determined by the fund's manager
$r_i$=the percentage of the $i^{th}$ investment of the fund remaining at the time of the most recent distribution
$p_j$=the total capital called to date from the $j^{th}$ investor
$c_t$ (expressed formulaically above)=the total value of called capital awaiting investment plus the aggregate cost of all n fund investments; and
determining using said IPAC, if said initial investment portfolio including said change in one of said multiple investments satisfies said initial investment profile.

20. Apparatus for managing an investment profile of an investor, comprising:
means for determining an initial investment profile for said investor;
means for developing, based on said initial investment profile, a recommended investment portfolio including calculating an initial investment amount in an investment fund including multiple investments;
means for inputting into the computer information relating to a change in one of said multiple investments;
means for calculating on the computer an IPAC to determine the amount of money working in said investment vehicle for said investor;

said step of calculating said first IPAC comprising $$IPAC_j = \frac{p_j * \left(a + \min\left[\sum_{i=1}^{n}(r_i * c_i), \sum_{i=1}^{n} r_i * m_i\right]\right)}{c_t}$$

Where $$c_t = a + \sum_{i=1}^{n} c_i$$

where:
n=the total number of investments made by an investment vehicle to date, including investments which have been liquidated such as being paid out in cash or determined to have zero value
a=total called investor capital awaiting investment
$c_i$=the cost to the fund of the $i^{th}$ investment of the n investments
$m_i$=the most recent fair value of the $i^{th}$ investment as determined by the fund's manager
$r_i$=the percentage of the $i^{th}$ investment of the fund remaining at the time of the most recent distribution
$p_j$=the total capital called to date from the $j^{th}$ investor
$c_t$ (expressed formulaically above)=the total value of called capital awaiting investment plus the aggregate cost of all n fund investments
    means for outputting from said computer said IPAC; and
    means for determining using said IPAC, if said initial investment portfolio including said change in one of said multiple investments satisfies said initial investment profile.

21. The apparatus of claim 20 and further comprising:
means for outputting said recommended portfolio;
means for outputting said change to said one of said multiple investments;
means for outputting said IPAC; and
means for transmitting said recommended portfolio, said change to said one of said multiple investments and said IPAC to said investor.

22. A program product containing computer-executable instructions operative to manage an investment profile of an investor, said program product comprising:
said instructions operative to control said computer to perform the steps of
determining an initial investment profile for said investor;
developing, based on said initial investment profile, a recommended investment portfolio including calculating an initial investment amount in an investment fund including multiple investments;
inputting into the computer information relating to a change in one of said multiple investments;
calculating on the computer an IPAC to determine the amount of money working in said investment vehicle for said investor;

said step of calculating said first IPAC comprising $$IPAC_j = \frac{p_j * \left(a + \min\left[\sum_{i=1}^{n}(r_i * c_i), \sum_{i=1}^{n} r_i * m_i\right]\right)}{c_t}$$

Where $$c_t = a + \sum_{i=1}^{n} c_i$$

where:
n=the total number of investments made by an investment vehicle to date, including investments which have been liquidated such as being paid out in cash or determined to have zero value
a=total called investor capital awaiting investment
$c_i$=the cost to the fund of the $i^{th}$ investment of the n investments
$m_i$=the most recent fair value of the $i^{th}$ investment as determined by the fund's manager
$r_i$=the percentage of the $i^{th}$ investment of the fund remaining at the time of the most recent distribution
$p_j$=the total capital called to date from the $j^{th}$ investor
$c_t$ (expressed formulaically above)=the total value of called capital awaiting investment plus the aggregate cost of all n fund investments
    outputting from said computer said IPAC; and
        determining using said IPAC, if said initial investment portfolio including said change in one of said multiple investments satisfies said initial investment profile.

23. A method of using a computer to structure an investment portfolio of one investor having multiple investments, comprising the steps of:
receiving fund management information relating to said investment vehicle;
receiving investor information relating to said investor;
calculating on said computer, using said fund management information and said investor information, an IPAC to determine the amount of money working in said investment vehicle;
outputting from said computer said IPAC; and
determining, using said IPAC, if a change to said investment portfolio is appropriate;
said step of calculating said first IPAC comprising $$IPAC_j = \frac{p_j * \left(a + \min\left[\sum_{i=1}^{n}(r_i * c_i), \sum_{i=1}^{n} r_i * m_i\right]\right)}{c_t}$$

Where $$c_t = a + \sum_{i=1}^{n} c_i$$

where:
n=the total number of investments made by an investment vehicle to date, including investments which have been liquidated such as being paid out in cash or determined to have zero value
a=total called investor capital awaiting investment
$c_i$=the cost to the fund of the $i^{th}$ investment of the n investments
$m_i$=the most recent fair value of the $i^{th}$ investment as determined by the fund's manager
$r_i$=the percentage of the $i^{th}$ investment of the fund remaining at the time of the most recent distribution
$p_j$=the total capital called to date from the $j^{th}$ investor
$c_t$ (expressed formulaically above)=the total value of called capital awaiting investment plus the aggregate cost of all n fund investments.

24. Apparatus for structuring an investment portfolio of one investor having multiple investments, comprising:
a processor;
a memory connected to said processor and storing fund management information relating to said investment vehicle and investor information relating to said investor;
said processor operative with said fund management information and said investor information and instructions in said memory to perform the steps of
calculating on said computer, using said fund management information and said investor information, an IPAC to determine the amount of money working in said investment vehicle;
outputting from said computer said IPAC; and
determining, using said IPAC, if a change to said investment portfolio is appropriate;
said step of calculating said first IPAC comprising $$IPAC_j = \frac{p_j * \left(a + \min\left[\sum_{i=1}^{n}(r_i * c_i), \sum_{i=1}^{n} r_i * m_i\right]\right)}{c_t}$$

Where $$c_t = a + \sum_{i=1}^{n} c_i$$

where:
n=the total number of investments made by an investment vehicle to date, including investments which have been liquidated such as being paid out in cash or determined to have zero value
a=total called investor capital awaiting investment
$c_i$=the cost to the fund of the $i^{th}$ investment of the n investments
$m_i$=the most recent fair value of the $i^{th}$ investment as determined by the fund's manager
$r_i$=the percentage of the $i^{th}$ investment of the fund remaining at the time of the most recent distribution
$p_j$=the total capital called to date from the $j^{th}$ investor
$c_t$ (expressed formulaically above)=the total value of called capital awaiting investment plus the aggregate cost of all n fund investments.

25. A method of using a computer to initiate a buy, sell or hold of a fund in an investment vehicle, comprising the steps of:
receiving fund management information relating to said investment vehicle;
receiving investor information relating to said investor;
calculating on said computer, using said fund management information and said investor information, an IPAC to determine the amount of money working in said investment vehicle;
outputting from said computer said IPAC; and
initiating, based on said IPAC, a buy, sell or hold of said fund;
said step of calculating said first IPAC comprising $$IPAC_j = \frac{p_j * \left(a + \min\left[\sum_{i=1}^{n}(r_i * c_i), \sum_{i=1}^{n} r_i * m_i\right]\right)}{c_t}$$

Where $$c_t = a + \sum_{i=1}^{n} c_i$$

where:
n=the total number of investments made by an investment vehicle to date, including investments which have been liquidated such as being paid out in cash or determined to have zero value
a=total called investor capital awaiting investment
$c_i$=the cost to the fund of the $i^{th}$ investment of the n investments
$m_i$=the most recent fair value of the $i^{th}$ investment as determined by the fund's manager
$r_i$=the percentage of the $i^{th}$ investment of the fund remaining at the time of the most recent distribution
$p_j$=the total capital called to date from the $j^{th}$ investor
$c_t$ (expressed formulaically above)=the total value of called capital awaiting investment plus the aggregate cost of all n fund investments.

26. Apparatus for initiating a buy, sell or hold of a fund in an investment vehicle, comprising:
a processor;
a memory connected to said processor and storing fund management information relating to said investment vehicle and investor information relating to said investor;
said processor operative with said fund management information and said investor information and instructions in said memory to perform the steps of
calculating on said computer, using said fund management information and said investor information, an IPAC to determine the amount of money working in said investment vehicle;
outputting from said computer said IPAC; and
initiating a buy, sell or hold, based on said IPAC, of said fund;
said step of calculating said first IPAC comprising $$IPAC_j = \frac{p_j * \left(a + \min\left[\sum_{i=1}^{n}(r_i * c_i), \sum_{i=1}^{n} r_i * m_i\right]\right)}{c_t}$$

Where $$c_t = a + \sum_{i=1}^{n} c_i \quad\quad (5)$$

where:
n=the total number of investments made by an investment vehicle to date, including investments which have been liquidated such as being paid out in cash or determined to have zero value
a=total called investor capital awaiting investment
$c_i$=the cost to the fund of the $i^{th}$ investment of the n investments
$m_i$=the most recent fair value of the $i^{th}$ investment as determined by the fund's manager
$r_i$=the percentage of the $i^{th}$ investment of the fund remaining at the time of the most recent distribution
$p_j$=the total capital called to date from the $j^{th}$ investor
$c_t$ (expressed formulaically above)=the total value of called capital awaiting investment plus the aggregate cost of all n find investments.

* * * * *